(No Model.)
J. VACHERESSE.
COFFEE OR TEA POT.
No. 272,802. Patented Feb. 20, 1883.
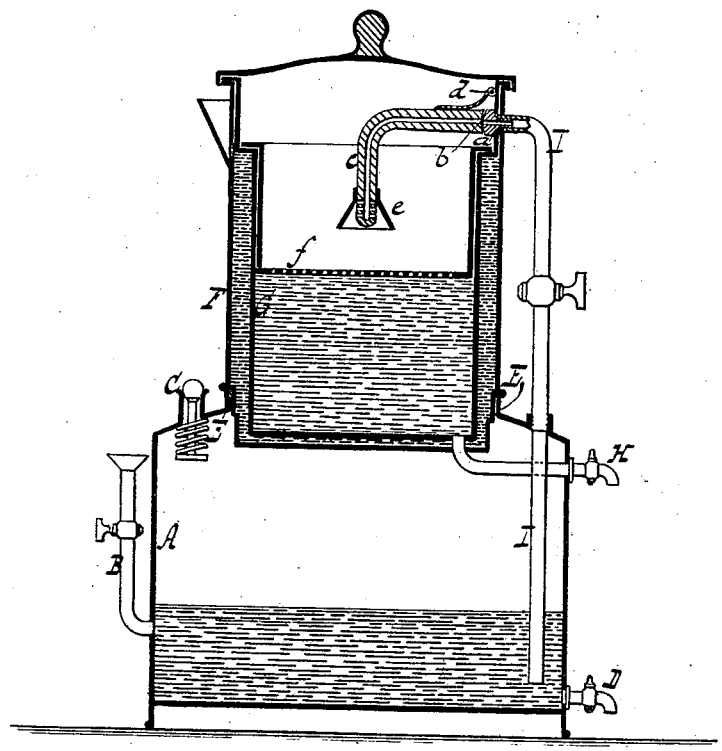
WITNESSES:
William Miller
Chas. Wahlers
INVENTOR
Jules Vacheresse
BY Van Santvoord & Hauff
ATTORNEYS

UNITED STATES PATENT OFFICE.

JULES VACHERESSE, OF EAST NEW YORK, N. Y.

COFFEE OR TEA POT.

SPECIFICATION forming part of Letters Patent No. 272,802, dated February 20, 1883.

Application filed January 11, 1883. (No model.)

*To all whom it may concern:*

Be it known that I, JULES VACHERESSE, a citizen of the United States, residing at East New York, in the county of Kings and State of New York, have invented new and useful Improvements in Coffee or Tea Pots, of which the following is a specification.

This invention relates to an improved coffee or tea pot or boiler, the construction of which is pointed out in the following specification and illustrated in the accompanying drawing, which is a vertical central section.

In this drawing, the letter A designates a boiler, provided with a water-supply pipe, B, a safety-valve, C, and a water-discharge faucet, D. The boiler has a circular opening in the top, provided with a threaded flange, E, to which is connected a water bath, F, containing the receptacle or percolator G, the latter being suspended in the water bath, and having connected with it a delivery-faucet, H. From the interior and lower part of the boiler A extends a pipe, I, upward and into the percolator at or near the top thereof, being connected thereto by a nut, *a*, the inner surface of which forms the seat for a valve, *b*, formed at the inner end of a pipe, *c*, which is connected to the inner wall of the receptacle or percolator by a hinge-joint, *d*. The inner end of the pipe *c* is perforated and surrounded by a spreader, *e*. In the interior of the receptacle or percolator is placed the sieve *f*, which contains the ground coffee or other substance to be acted on. When the water in the boiler is heated to the boiling-point it is driven up through the pipe I and caused to discharge through the perforations in the pipe *c*, so that it is thrown against the spreader *e* and distributed uniformly over the ground coffee or other material on the sieve *f*. The extract collects in the bottom part of the receptacle or percolator. By the water bath F the extract is prevented from being heated to the boiling-point. When the top of the receptacle or percolator is taken off, the pipe *c* can be swung up, and when the nut *a* is unscrewed the pipe I can be forced back so as to clear the receptacle or percolator and allow of removing the same, together with the water bath F, from the boiler. The ready-made extract is drawn from the receptacle or percolator through the delivery-faucet H, and while in the former it is kept hot for a long time by the water bath F.

What I claim as new, and desire to secure by Letters Patent, is—

1. The combination, substantially as hereinbefore described, of the boiler A, the receptacle or percolator G, the water bath F, surrounding the percolator, and the pipe I, extending from the interior of the boiler into the receptacle or percolator, said pipe projecting down into the boiler, and having its lower end terminated adjacent to the bottom thereof for conveying heated water from the boiler and distributing it over the coffee supported in the receiver or percolator.

2. The combination, substantially as hereinbefore described, of the boiler A, the percolator G, the pipe I, rising from the boiler and passing into the upper part of the percolator, the nut *a* for securing the upper end of said pipe in position, the hinged pipe *c*, and the spreader *e*.

In testimony whereof I have hereunto set my hand and seal in the presence of two subscribing witnesses.

JULES VACHERESSE. [L. S.]

Witnesses:
W. HAUFF,
E. F. KASTENHUBER.